(12) United States Patent
Dyess et al.

(10) Patent No.: US 12,346,142 B2
(45) Date of Patent: *Jul. 1, 2025

(54) CONTROLLING THE SETBACK AND SETBACK RECOVERY OF A POWER-CONSUMING DEVICE

(71) Applicant: GridPoint, Inc., Reston, VA (US)

(72) Inventors: Daniel K. Dyess, Roanoke, VA (US); E. Channing Preston, Jr., Roanoke, VA (US)

(73) Assignee: GridPoint, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,757

(22) Filed: Mar. 14, 2023

(65) Prior Publication Data

US 2024/0045459 A1 Feb. 8, 2024

Related U.S. Application Data

(63) Continuation of application No. 17/303,190, filed on May 24, 2021, now abandoned, which is a
(Continued)

(51) Int. Cl.
*F24F 11/30* (2018.01)
*F24F 11/46* (2018.01)
(Continued)

(52) U.S. Cl.
CPC ................ *G05F 1/66* (2013.01); *F24F 11/30* (2018.01); *F24F 11/47* (2018.01); *F24F 11/56* (2018.01);
(Continued)

(58) Field of Classification Search
CPC ........ F24F 11/58; F24F 11/65; F24F 2110/10; F24F 2110/20; F24F 11/46; F24F 2140/50; F24F 1/0003; F24F 11/30; F24F 11/62; F24F 11/64; F24F 11/63; F24F 2120/10; F24F 11/48; G05B 15/02;
(Continued)

(56) References Cited

U.S. PATENT DOCUMENTS 4,272,012 A 6/1981 Molnar et al.
4,386,649 A 6/1983 Hines et al.
(Continued)

OTHER PUBLICATIONS

International Preliminary Report on Patentability of Dec. 17, 2013 for PCT International Application No. PCT/US2012/042276, International Filing Date Jun. 13, 2012.
(Continued)

*Primary Examiner* — Darrin D Dunn
(74) *Attorney, Agent, or Firm* — Bookoff McAndrews, PLLC (57) ABSTRACT

Systems and methods are provided for controlling a setback mode of a power-consuming device, and for controlling setback recovery of power-consuming devices, in order to make setback and setback recovery more dynamic based on current environmental parameters and previous observed operating parameters, in order to enable more efficient operation of power-consuming devices resulting in reduced energy costs and increased power efficiency.

13 Claims, 5 Drawing Sheets

Related U.S. Application Data continuation of application No. 16/191,968, filed on Nov. 15, 2018, now abandoned, which is a continuation of application No. 15/238,421, filed on Aug. 16, 2016, which is a continuation of application No. 13/495,720, filed on Jun. 13, 2012, now Pat. No. 9,436,199.

(60) Provisional application No. 61/496,431, filed on Jun. 13, 2011, provisional application No. 61/496,422, filed on Jun. 13, 2011.

(51) Int. Cl.
| | | |
|---|---|---|
| *F24F 11/47* | (2018.01) | |
| *F24F 11/56* | (2018.01) | |
| *F24F 11/62* | (2018.01) | |
| *F24F 11/63* | (2018.01) | |
| *F24F 11/64* | (2018.01) | |
| *F24F 11/65* | (2018.01) | |
| *G05B 15/02* | (2006.01) | |
| *G05B 19/048* | (2006.01) | |
| *G05F 1/66* | (2006.01) | |
| *G06N 5/04* | (2023.01) | |
| *F24F 140/00* | (2018.01) | |

(52) U.S. Cl.
CPC ............. *F24F 11/62* (2018.01); *F24F 11/63* (2018.01); *F24F 11/64* (2018.01); *F24F 11/65* (2018.01); *G05B 15/02* (2013.01); *G05B 19/048* (2013.01); *G06N 5/04* (2013.01); *F24F 11/46* (2018.01); *F24F 2140/00* (2018.01); *G05B 2219/2614* (2013.01)

(58) Field of Classification Search
CPC .......... G05B 2219/2614; G05B 19/042; G05B 2219/2642; G05B 13/00; G06N 20/00
See application file for complete search history.

(56) References Cited

U.S. PATENT DOCUMENTS

| | | | |
|---|---|---|---|
| 4,522,336 A | 6/1985 | Culp | |
| 4,620,668 A | 11/1986 | Adams | |
| 4,991,770 A | 2/1991 | Bird et al. | |
| 5,025,984 A | 6/1991 | Bird et al. | |
| 5,115,967 A | 5/1992 | Wedekind | |
| 5,197,666 A | 3/1993 | Wedekind | |
| 5,219,119 A | 6/1993 | Kasper et al. | |
| 5,244,146 A | 9/1993 | Jefferson et al. | |
| 5,270,952 A | 12/1993 | Adams et al. | |
| 5,314,004 A | 5/1994 | Strand et al. | |
| 5,395,042 A | 3/1995 | Riley et al. | |
| 5,555,927 A | 9/1996 | Shah | |
| 5,822,997 A | 10/1998 | Atterbury | |
| 6,196,467 B1 | 3/2001 | DuShane et al. | |
| 6,290,140 B1 | 9/2001 | Pesko et al. | |
| 6,402,043 B1 | 6/2002 | Cockerill | |
| 6,478,233 B1 | 11/2002 | Shah | |
| 6,536,675 B1 | 3/2003 | Pesko et al. | |
| 7,099,748 B2 | 8/2006 | Rayburn | |
| 7,138,732 B2 | 11/2006 | Biskup et al. | |
| 7,809,472 B1 | 10/2010 | Silva et al. | |
| 8,141,791 B2 | 3/2012 | Rosen | |
| 8,204,628 B2 | 6/2012 | Schnell et al. | |
| RE44,146 E | 4/2013 | Bagwell et al. | |
| 8,556,188 B2 | 10/2013 | Steinberg | |
| 9,134,710 B2 | 9/2015 | Cheung et al. | |
| 9,377,212 B2* | 6/2016 | Wallaert | F24F 11/64 |
| 9,436,199 B2 | 9/2016 | Dyess et al. | |
| 9,574,785 B2* | 2/2017 | Stachler | F24F 11/62 |
| 9,740,385 B2 | 8/2017 | Fadell et al. | |
| 9,869,484 B2 | 1/2018 | Hester et al. | |
| 9,910,449 B2 | 3/2018 | Matsuoka et al. | |
| 10,012,406 B2 | 7/2018 | Kim | |
| 10,095,250 B2 | 10/2018 | Chan | |
| 10,281,937 B2 | 5/2019 | Barrett et al. | |
| 10,281,938 B2 | 5/2019 | Mowris et al. | |
| 10,436,977 B2 | 10/2019 | Bergman et al. | |
| 10,649,418 B2 | 5/2020 | Quam et al. | |
| 10,678,416 B2 | 6/2020 | Fadell et al. | |
| 10,866,609 B2 | 12/2020 | Dyess et al. | |
| 11,156,971 B2 | 10/2021 | Buda et al. | |
| 2003/0150925 A1 | 8/2003 | Archacki et al. | |
| 2004/0107717 A1 | 6/2004 | Yoon et al. | |
| 2005/0288822 A1* | 12/2005 | Rayburn | F24F 11/30 |
| | | | 236/46 R |
| 2008/0083834 A1 | 4/2008 | Krebs et al. | |
| 2008/0099570 A1* | 5/2008 | Krebs | F23N 5/203 |
| | | | 236/46 R |
| 2009/0005912 A1 | 1/2009 | Srivastava et al. | |
| 2010/0163633 A1 | 7/2010 | Barrett et al. | |
| 2010/0243231 A1 | 9/2010 | Rosen | |
| 2010/0292849 A1 | 11/2010 | Peterson et al. | |
| 2011/0238224 A1 | 9/2011 | Schnell et al. | |
| 2011/0270452 A1 | 11/2011 | Lu et al. | |
| 2011/0307103 A1 | 12/2011 | Cheung et al. | |
| 2012/0065783 A1 | 3/2012 | Fadell et al. | |
| 2012/0085831 A1 | 4/2012 | Kopp | |
| 2012/0185101 A1 | 7/2012 | Leen et al. | |
| 2013/0013122 A1* | 1/2013 | Dyess | F24F 11/63 |
| | | | 700/295 |
| 2013/0153195 A1 | 6/2013 | Wallaert | |
| 2014/0039692 A1* | 2/2014 | Leen | F24F 11/62 |
| | | | 700/278 |
| 2015/0142181 A1 | 5/2015 | Stachler et al. | |
| 2016/0201933 A1 | 7/2016 | Hester et al. | |
| 2016/0202712 A1 | 7/2016 | Chan | |
| 2016/0357209 A1 | 12/2016 | Dyess et al. | |
| 2019/0011939 A1 | 1/2019 | Chan | |
| 2019/0024925 A1 | 1/2019 | Wu et al. | |
| 2019/0310673 A1 | 10/2019 | Dyess et al. | |
| 2020/0241492 A1 | 7/2020 | Buda et al. | |
| 2021/0010703 A1 | 1/2021 | Brown et al. | |
| 2022/0163989 A1 | 5/2022 | Dyess et al. | |

OTHER PUBLICATIONS

International Search Report issued on Jan. 2, 2013 in corresponding PCT international application PCT/US12/42276.

\* cited by examiner

CONTROLLING THE SETBACK AND SETBACK RECOVERY OF A POWER-CONSUMING DEVICE

CROSS-REFERENCES TO RELATED APPLICATIONS

This application is a continuation of U.S. application Ser. No. 17/303,190, filed May 24, 2021, which is a continuation of U.S. application Ser. No. 16/191,968, filed Nov. 15, 2018, which is a continuation of U.S. application Ser. No. 15/238,421, filed Aug. 16, 2016, which is a continuation of U.S. application Ser. No. 13/495,720, filed Jun. 13, 2012, now U.S. Pat. No. 9,436,199, issued Sep. 6, 2016, which claims benefit under 35 U.S.C. § 119(e) to U.S. Provisional Patent Application No. 61/496,422, filed Jun. 13, 2011, and U.S. Provisional Patent Application No. 61/496,431, filed Jun. 13, 2011, each of which is hereby incorporated by reference in its entirety.

BACKGROUND OF THE INVENTION

1. Field of the Invention

The invention generally relates to managing the operation of power-consuming devices. In particular, the invention relates to systems and methods for more efficiently controlling the setback and setback of recovery of power-consuming devices.

2. Description of the Related Art

Conventionally, power consuming devices are "setback" to reduced levels of operation for certain periods of time, in order to conserve energy and reduce operational costs. For example, a Heating, Ventilation, and Air Conditioning (HVAC) system for a business may be set to maintain a lower temperature during night time, when the business is closed. Or, a computer system may be set to a reduced level of operation, for example a "standby mode," during a period of time in which it is not in active use.

Such systems also employ setback recovery methods, by which the power consuming devices are returned to normal levels of operation. For example, the HVAC system for the business may begin to maintain a higher temperature when the business opens, or the computer system may return from "standby mode" at a time when it will be in active use.

As energy management initiatives are deployed across the commercial industry, store owners are looking to more intelligent controls for power consuming devices, in order to reduce their energy bills. The present system and method of controlling the setback and setback recovery of power-consuming devices provides a solution for this need.

BRIEF SUMMARY OF THE INVENTION

Systems and methods for controlling the setback and setback recovery of a power-consuming device are provided. A setback setting input is received, such as the time to enter setback, or an environmental parameter to trigger setback, and the setting input is modified based on a current environmental parameter and a determined drift value, which measures the rate at which the environment changes when the power-consuming device is in setback mode. Based on this modified setting input, the power-consuming device may be instructed to enter setback mode at an advantageous time.

When a plurality of devices are in setback mode, setback recovery may be improved by comparing the current environmental state of each power-consuming device with a predefined environmental parameter and stored performance data from the prior setback recovery operation, and adjusting the setback recovery settings of the power-consuming devices accordingly. As a result, the power-consuming devices may exit setback mode at a more advantageous time.

BRIEF DESCRIPTION OF THE DRAWINGS

These and other features, aspects, and advantages of the present invention will become better understood with reference to the following description and appended claims, and accompanying drawings where:

The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be stand-alone programs, may be incorporated as subroutines in an operating system, may be functions in an installed software package, and the like.

It should be understood that the various embodiments are not limited to the arrangements and instrumentality shown in the drawings.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Figure 1:
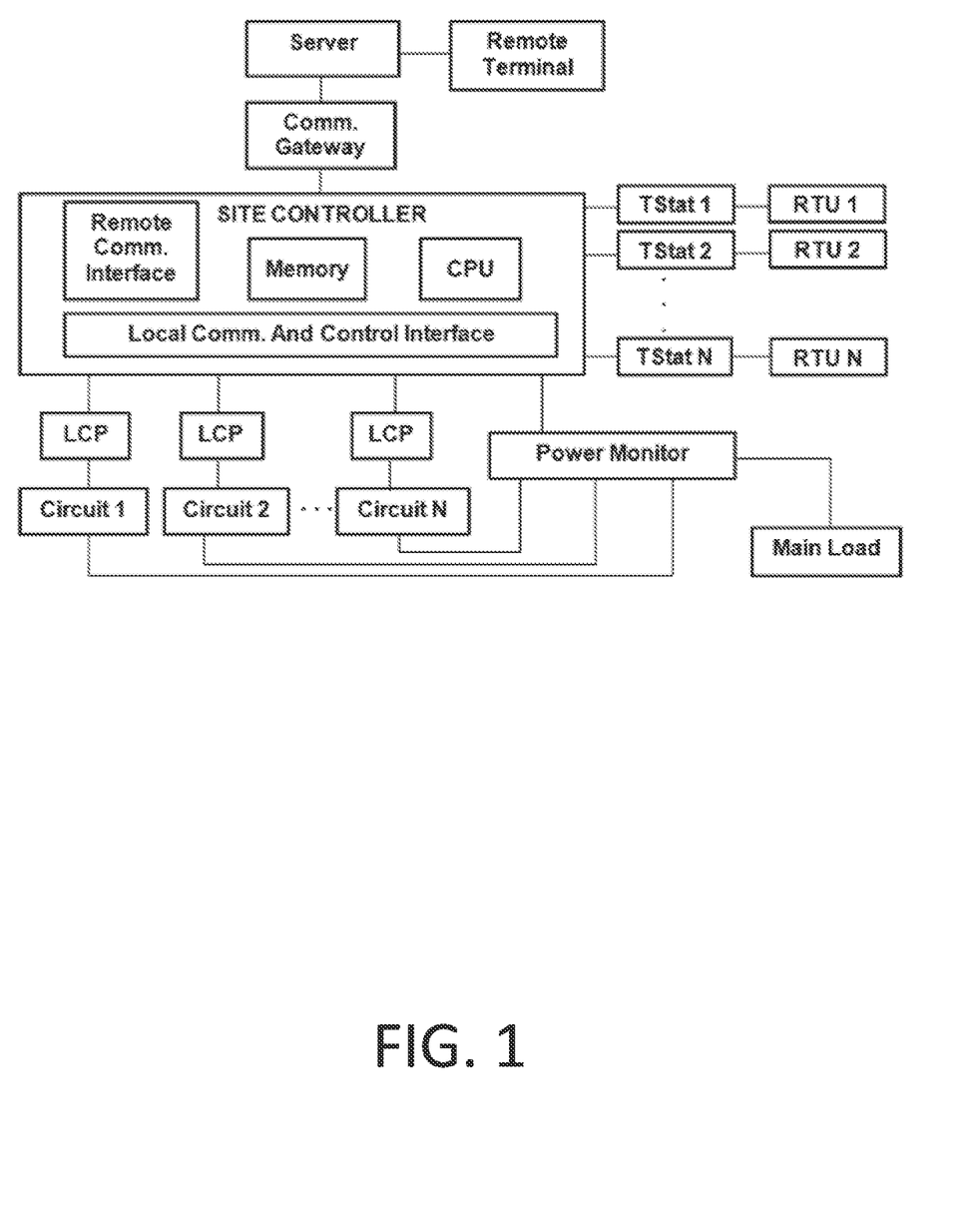
FIG. 1 is a block diagram illustrating an exemplary energy management system.

FIG. 1 shows a schematic block diagram illustrating an exemplary energy management system for practicing the invention. A site controller with embedded control algorithms controls multiple electrical loads on circuits 1 through N via light control panels (LCPs). The site controller is typically wired to common voltages at an electrical distribution panel of a commercial or residential building facility via a main line meter (power monitor). The site controller includes memory and a CPU for respectively storing and implementing energy management algorithms.

The algorithms accept real-time power and environmental variable measurements (including readings from thermostats TStat 1 through TStat N) as inputs and determine how to control the power delivered on the circuits 1 through N and to control set points and other configurable settings such as enabling/disabling compressor stages on TStat 1 through TStat N. The site controller may include a power supply and one or more wired or wireless local communication and control interfaces for controlling Circuit 1 through Circuit N and TStat 1 through TStat N. Thermostats TStat 1 through TStat N provide temperature and humidity inputs to the site controller, and output control signals to roof-top units RTU 1 through RTU N. A communication interface provides bi-directional communication with a communication gateway, which in turn manages wired or wireless communications with a server or remote terminal.

One or more power monitors are coupled to the site controller either via wired or wireless connection. The power monitor includes hardware and firmware to provide sampling functionality, including multiple analog-to-digital converters for multi-channel fast waveform sampling of inputs such as current and voltage. The power monitor includes wired or wireless communication interfaces, current and voltage monitoring interfaces, memory, CPU, and may also include a power supply.

The current and voltage monitoring interfaces connect between the power circuits being monitored and the A/D converter. Each channel may be connected to a separate power circuit to monitor the flow of current through the circuit. The connection is typically made with a current transformer at both a supply (i.e., hot) line and a return (i.e., neutral) line of the power circuit, which provides a waveform signal that is representative of the current flow at the connection point.

According to the present invention, a "drift value" for a power-consuming device is a rate of change of an environmental parameter while the power-consuming device is in setback mode. For example, in an HVAC system, a drift value could be the rate of change in ambient temperature while the HVAC system is shut off for the night. However, any environmental parameter could be monitored to calculate a drift value.

The various embodiments of the invention provide a system and method of controlling the setback and setback recovery of a power consuming device. For example, the system and method may control the setback of a power-consuming device such as cooling equipment, temperature control equipment, lighting equipment, industrial machinery, manufacturing machinery, household appliances, or other power-consuming devices. In one embodiment, the power-consuming device can be a part of a power-consuming system. For example, the power-consuming device can be one of a plurality of power-consuming devices.

In many cases, power consuming devices, for example, HVAC equipment, will run up to the moment when setback occurs and the set point changes. For example, the moment can be when the zone should be unoccupied, or the site closes. In some instances, it is not necessary to continue to condition the space up to the time it becomes unoccupied. To address such an instance, the controller (for example, a control system of the user of the control system) of the HVAC equipment can: 1) change the unoccupied time to an earlier time, typically 15 minutes before the store closes or 2) create another period where the set point changes by a few degrees before the store closes. Such methods are static.

The present system and method for controlling the setback of a power-consuming device can dynamically control the setback of the power-consuming device and provide for an enhanced control of the power-consuming device.

A first embodiment of the invention has a variety of aspects, including, but not limited to, a processor-implemented method, a system, and a non-transitory computer readable medium having computer-readable code stored thereon for causing a computer to perform a method.

In the first aspect of the first embodiment of the invention, the method of controlling a setback mode of a power-consuming device can include determining a previous drift value. The previous drift value is a rate of change of at least one previous environmental parameter observed while the power-consuming device was in a previous setback mode, and receiving, at a processor component, at least one setback setting, wherein the received setback setting corresponds to at least one of a setback entry time, a setback environmental parameter, a setback parameter differential, and combinations thereof. The setback entry time can be a programmed time at which the power-consuming device will enter the setback mode. The setback environmental parameter can be a threshold value for an environmental parameter of the power-consuming device at which the power-consuming device will enter the setback mode. The setback parameter differential can be a target change in an environmental parameter of the power-consuming device when the power-consuming device enters the setback mode. The method can also include receiving data indicative of a current environmental parameter, and calculating a replacement setback setting based at least on the previous drift value, the received setback setting, and the data indicative of the current environmental parameter. The method can also include sending instructions to the power-consuming device to enter the setback mode based at least on the replacement setback setting.

The method can further include monitoring the current environmental parameter; comparing the current environmental parameter to a predefined operating environmental parameter; entering a shut-off mode when the current environmental parameter is within a predefined threshold of the predetermined operating environmental parameter; exiting the shut-off mode when the current environmental parameter is not within the predefined threshold of the predetermined operating environmental parameter; determining a current drift value based at least in part on the predetermined operating environmental parameter and the current environmental parameter when the current environmental parameter is not within the predefined threshold of the predetermined operating environmental parameter; and replacing the previous drift value with the current drift value.

Determining the current drift value can include: monitoring a shut-off time corresponding to the power-consuming device entering the shut-off mode; monitoring a turn-on time corresponding to the power-consuming device exiting the shut-off mode; and computing the current drift value based at least in part on the predetermined operating environmental parameter and the current environmental parameter when the current environmental parameter is not within the predefined threshold of the predetermined operating environmental parameter, and a difference between the shut-off time and the turn-on time. For example, the current drift value is a ratio of a difference between the predetermined operating environmental parameter and the current environmental parameter, when the current environmental parameter is not within the predefined threshold of the predetermined operating environmental parameter, to the difference between the shut-off time and the turn-on time. A system for controlling the setback of a power-consuming device can include can include one or more hardware components configured to execute any or all of the method steps described above.

In a second aspect of the first embodiment of the invention, a system for controlling a setback mode of a power-consuming device can include a processor configured to determine a previous drift value. The previous drift value is a rate of change of at least one previous environmental parameter observed while the power-consuming device was in a previous setback mode. The processor can be further configured to receive at least one setback setting, the received setback setting corresponding to at least one of a setback entry time, a setback environmental parameter, and a setback parameter differential. The setback entry time can be a programmed time at which the power-consuming device will enter the setback mode. The setback environmental parameter can be a threshold value for an environmental parameter of the power-consuming device at which the power-consuming device will enter the setback mode. The setback parameter differential can be a target change in an environmental parameter of the power-consuming device when the power-consuming device enters the setback mode. The processor can also be configured to receive data indicative of a current environmental parameter, and calculate a replacement setback setting based at least on the previous drift value, the received setback setting, and the data indicative of the current environmental parameter. The system can further include a controller configured to instruct the power-consuming device to enter the setback mode based at least on the replacement setback setting.

The processor can also be configured to compare the current environmental parameter to a predetermined operating environmental parameter, determine a current drift value based at least on the predetermined operating environmental parameter and the current environmental parameter when the current environmental parameter is not within the predefined threshold of the predetermined operating environmental parameter, and replace the previous drift value with the current drift value.

The controller can further be configured to instruct the power-consuming device to enter a shut-off mode when the current environmental parameter is within a predefined threshold of the predetermined operating environmental parameter, and to instruct the power-consuming device to exit the shut-off mode when the current environmental parameter is not within the predefined threshold of the predetermined operating environmental parameter.

The system and method of controlling the setback of a power-consuming device can reduce the run-time or the operating time of at least one power-consuming device, which can thereby increase the power inefficiency of the device and reduce the energy cost of the device. Additionally, the system and method of controlling the setback of the power-consuming device can extend the life of the power-consuming device. For example, in an embodiment where the power-consuming device is a commercial HVAC unit, the implementation of the system and method of controlling the setback of the HVAC unit can reduce commercial HVAC equipment run-time, in turn reducing at least one of equipment maintenance, extending equipment life, and reduce energy cost. Additionally, with the system and method of controlling the setback of a power-consuming device, less impact on the environment in which the power-consuming device (for example, an HVAC unit) is controlling.

The system and method for controlling the setback of a power-consuming device, in accordance with the present technology provides a learning process that allows a space (for example, a room, a building, or other similar environment) to drift into setback by a specified temperature differential at a specified time. This results in a completely controlled setback entry that is configurable.

For example, the system and method for controlling the setback of a power-consuming device can control a thermostat for a power-consuming system comprising a plurality of HVAC units. For example, the system for controlling the setback of a power-consuming unit can program a thermostat with a setback entry temperature differential parameter. The temperature differential parameter can be a range of temperatures, for example, a range of temperatures having an upper and lower limit. The range can exclude or include the upper and/or the lower limit. For example, the lower limit and/or upper limit can be selected from 1, 2, 3, 4, 5, 6, 7, 8, 9, 10, 11, 12, 13, 14, 15, 16, 17, 18, 19, and 20° F. For example, from 0-5° F. However, those of ordinary skill in the art will appreciate that the differential parameter can be a larger or smaller range of temperature, temperatures other than in Fahrenheit, a range other than by integers, or other differential parameters.

The system for controlling the setback of a power-consuming device can define the allowable temperature delta from the set point at the time of setback entry. During the normal operation of the thermostat during the occupied period (for example, the time period in which the site is open for business, when employees or customers are typically located at the site, during the hours of operation of the site, or other time period in which the site is occupied), the thermostat calculates a temperature drift value. This value is the change in temperature over time when the HVAC equipment is not operating. For example, the system and method can monitor when the HVAC equipment reaches a specified temperature or predetermined threshold (for example, a preset or predefined temperature) and shuts off or enters a shut-off mode, and when the HVAC equipment turns on and exits the shut-off mode when the HVAC equipment falls below or above the predetermined threshold (depending on whether the HVAC equipment is operating in a cooling mode or a heating mode). A new drift value is calculated after each HVAC operation event, where the previous drift value is discarded.

Although, the system and method of controlling the setback of a power-consuming device is described in relation to a cooling operation, those of ordinary skill in the art will appreciate that the system and method of controlling the setback of a power-consuming unit can be applied to heating operations. Additionally, while the present disclosure describes an environmental parameter that is a temperature, those of ordinary skill in the art will appreciate that the environmental parameter can be a humidity parameter, a dryness parameter, an amount of power consumed by the power-consuming device, the amount of fuel used by the power-consuming device, an amount of energy dissipated by the power-consuming the device, the speed at which an internal motor of a power-consuming unit is operating, an amount of light emitted from the power-consuming device, or other parameter that is indicative of the amount of work and power the power-consuming device is consuming.

The system and method for controlling the setback of a power consuming device (for example, a power-consuming device that is one of a plurality of power-consuming devices in a power-consuming system) allows for a substantially accurate change in temperature control to enter into setback. Conventional power-consuming systems allow a power-consuming device to simply enter into setback early, using an unknown drift parameter and are unable to control the change in temperature between the early entry time and the actual time when the zone becomes unoccupied. With the present system and method of controlling the setback of a power-consuming device, a power-consuming system can efficiently enter a setback mode by at least identifying a drift parameter.

A second embodiment has a variety of aspects, including, but not limited to, a processor-implemented method, a system, and a non-transitory computer readable medium having computer-readable code stored thereon for causing a computer to perform a method.

In a first aspect of the second embodiment of the invention, a method of controlling setback recovery of power-consuming devices is disclosed. The method can include receiving data indicative of a current environmental parameter of each of a plurality of power-consuming devices being in a setback mode, and comparing each current environmental parameter to a predefined environmental parameter of each power-consuming device and a stored recovery performance data of each power-consuming device. The predefined environmental parameter can include a target value for an environmental parameter of the power-consuming device after the power-consuming device exits the setback mode. The stored recovery performance data can include a rate of change of at least one previous environmental parameter observed while the power-consuming device was recovering from a previous setback mode. The method can further include determining a modification value for each power-consuming device based at least on the corresponding comparison of the comparing step, and adjusting a setback recovery setting of each power-consuming device by the corresponding modification value. The setback recovery setting can include a time at which the power-consuming device will exit the setback mode. The method can further include sending instructions to each power-consuming device to exit the setback mode based at least on the corresponding adjusted setback recovery setting. The power-consuming devices can be instructed to exit the setback mode at the same time, or at various times.

The method can also include monitoring each current environmental parameter until the corresponding power-consuming device enters the setback recovery mode, calculating a recovery performance data for each power-consuming device based at least on the corresponding monitored current environmental parameter. The recovery performance data comprises a rate of change of the current environmental parameter while the current environmental parameter is being monitored. The method can further include replacing the stored recovery performance data for each power-consuming device with the corresponding calculated recovery performance data.

The method can also delay entry into setback recovery in instances where the difference between the current environmental parameter and a predefined environmental parameter is less than a predetermined value, such is often the case on a Spring day. In this case, the zone temperature is allowed to rise naturally without use of an HVAC system. If, after a predetermined setback recovery time period expires, the zone temperature is still below the predefined environmental parameter, the HVAC units are turned on to reach the predetermined environmental parameter.

The method of controlling setback recovery of a power-consuming device in a consuming system can also include receiving data indicative of a current environmental parameter of a first power-consuming device being in a setback mode. The method can also include comparing the current environmental parameter to a predefined environmental parameter and a stored recovery performance data. The method can determine a modification value based at least in part on the comparison of the current environmental parameter to a predefined environmental parameter and a stored previous recovery performance data. The method can adjust a setback recovery setting of the power-consuming device by the modification value, the setback recovery setting including a time when the first power-consuming device exits the setback mode. In another embodiment, the method can send instructions to the power-consuming device to exit the setback mode in response to adjusting the setback recovery setting; monitor the current environmental parameter until the power-consuming device enters the setback mode; determine recovery performance data based at least in part on the monitored current environmental parameter; and replace the stored previous recovery performance data with the calculated recovery performance. In yet another embodiment, the method can adjust the setback recovery setting independent of a second power-consuming unit located within a predetermined distance from the first power-consuming unit. A system for controlling the setback recovery of a power-consuming device in a power-consuming system can include one or more hardware components configured to execute any or all of the method steps described above.

For example, in the second embodiment of the invention, the method of controlling setback recovery of a power-consuming device can determine the optimum time for HVAC equipment to come out of night setback and reach an occupied setpoint at a specified point in time, while eliminating the influence of nearby HVAC units on a recovery thermostat. This method of controlling setback recovery, addresses the issue of multiple HVAC units providing heating/cooling for spaces that are not isolated zones. When a HVAC unit is heating or cooling a space and a thermostat for a different HVAC unit is being influenced, this influence can impact that thermostat's setback recovery and in some cases, not actually come out of setback early and have the other HVAC unit do all the recovery work. The present technology can solve the power-efficiency issues that can result from such a situation. In at least one embodiment, the present system and method of controlling setback recovery can control a particular unit's thermostat's setback recovery without the influence of a different unit's thermostat.

In a second aspect of the second embodiment of the invention, a system for controlling setback recovery of power-consuming devices is disclosed.

The system includes a processor configured to receive data indicative of a current environmental parameter of each of a plurality of power-consuming devices being in a setback mode, and compare each current environmental parameter to a predefined environmental parameter of each power-consuming device and a stored recovery performance data of each power-consuming device. The predefined environmental parameter can include a target value for an environmental parameter of the power-consuming device after the power-consuming device exits the setback mode. The stored recovery performance data can include a rate of change of at least one previous environmental parameter observed while the power-consuming device was recovering from a previous setback mode. The processor can be further configured to determine a modification value for each power-consuming device based at least on the corresponding comparison of each current environmental parameter to a predefined environmental parameter of each power-consuming device and a stored recovery performance data of each power-consuming device, and adjust a setback recovery setting of each power-consuming device by the corresponding modification value. The setback recovery setting can include a time at which the power-consuming device will exit the setback mode. The system can further include a controller configured to instruct each power-consuming device to exit the setback mode based at least on the corresponding adjusted setback recovery setting. The controller can instruct the power-consuming devices to exit the setback mode at the same time, or at various times.

The controller of the system can be further configured to monitor each current environmental parameter until the corresponding power-consuming device enters the setback recovery mode, calculate recovery performance data for each power-consuming device based at least on the corresponding monitored current environmental parameter, and replace the stored recovery performance data for each power-consuming device with the corresponding calculated recovery performance data.

For example, in the second embodiment of the invention, the system can be configured to coordinate the setback recovery of each of the power-consuming device in the power-consuming system. For example, the system for controlling the setback recovery can coordinate the setback recovery of at least one thermostat of at least one power-consuming device in the power-consuming system. In another embodiment, the system for controlling the setback recover can coordinate the setback recovery time for each of the thermostats of the power-consuming devices in the power-consuming system. The energy management system configured with the system for controlling setback recovery can determine the previous setback recovery data or the stored recovery performance data (for example, change in temperature over change in time) for each thermostat and use that previous setback recovery data to calculate the thermostat's startup time for the next setback recovery event. For example, based on the running or operating temperature delta (that is, the difference) the zone temperature (that is, the current temperature), and the target temperature (that is, temperature setpoint, desired temperature, or other pre-defined parameter) after recovery, the system for controlling setback recovery can determine a time that the HVAC unit should come out of setback to be able to meet the target temperature at a specified time. In at least one example, as will be described below, the previous setback recovery data can be the length of time the power-consuming unit took to reach the target temperature the last time the power-consuming unit entered the setback mode. However, those of ordinary skill in the art will appreciate that previous setback recovery data can include a ratio of the change in the monitored environmental parameter by the amount of time taken to make that change. The previous setback recovery data can also include the amount of time taken to change an environmental parameter by a predetermined value or other performance data from which a setback recovery setting can be derived.

For example, in second embodiment of the invention, the method and system for controlling setback recovery can be implemented on or configured with conventional energy management system (EMS). For example, the system for controlling setback recovery can include hardware (for example, a computing component, controller component, a processor component, or other similar hardware) that can communicate with thermostats of a system of power-consuming devices. The system can also include a logging component (for example a processing component, a sensor, a computing component, or other similar hardware) configured to log HVAC data. The system can also be configured to generate a report based on the logged data and transmit the report to a main controller component (for example, a server, a database, a central processor, or other similar component) to be analyzed at a later date.

Typical systems and method for controlling setback recovery are operated independently on a thermostat, without knowledge of what is happening with other thermostats in the system. This hinders the capability to recovery as a system and can overwork higher capacity HVAC units. For example, in setback recovery, some temperature measurements of thermostats of the power-consuming devices are influenced when neighboring HVAC units exit a shut-off mode (that is, the HVAC units were energized or powered on) to energize a heating or cooling process. In some instances, not all the HVAC units perform work to recover from night setback as a result of the corresponding thermostat being influenced by a neighboring HVAC unit or power-consuming device. In some instances, less than half the HVAC units do all the work. In such situations, excessive runtime was needed for those HVAC units doing all the recovery work, thereby reducing their overall operating life and the power-efficiency of the HVAC system.

For example, in the second embodiment of the invention, the system can periodically calculate (or modify or adjust) the setback recovery time for at least one power consuming device in the power-consuming system, for example, for each thermostat communicatively coupled to a power-consuming device of the power-consuming system. When the EMS determines it is time to bring the first thermostat of a group out of setback, the zone temperature at each thermostat is recorded and used in the calculation above. This is done because those zone temperatures should not change, only the zone for which the recovering thermostat controls. But, this is not always the case. So, using the respective last day recovery performance and the formula above, at the time when the first recovery thermostat turns the HVAC equipment on, the zone temperature for each respective thermostat is stored and used as the zone temperature in the recovery calculations.

Thus, in the second embodiment of the invention, the system and method for controlling the setback recovery of a power-consuming device can identify that a thermostat within a system of thermostats is impacting the recovery of the group, not just its zone. This identification is then factored into the recovery of the other thermostats so that the overall site recovery is handled by the group.

Furthermore, in the second embodiment of the invention, the received data can be indicative of a current environmental parameter of each power-consuming device, measured independently of the other power-consuming devices in the plurality of power-consuming devices, so that the setback recovery of one power-consuming device does not influence the data indicative of a current environmental parameter of other power-consuming devices in the plurality of power-consuming devices.

While this disclosure describes monitoring the temperature of a thermostat of an HVAC unit, those of ordinary skill will appreciate that other environmental parameters of a power-consuming device can be monitored. For example, the other environmental parameters can include the amount of power consumed by the power-consuming device, the amount of fuel used by the power-consuming device, the amount of energy dissipated by the power-consuming the device, the speed at which an internal motor of a power-consuming unit is operating, or other parameter that is indicative of the amount of work and power the power-consuming device is consuming.

EXAMPLES

Example 1

This example illustrates the calculation of a setback for HVAC equipment according to the first embodiment of the invention. The temperature Drift Value can be calculated according to Equation 1:

$$\text{Temperature Drift Value} = \frac{\Delta \text{Temp}}{\Delta \text{Time}} \qquad \text{Eq. 1}$$

Where ΔTemp is the temperature change from when the HVAC equipment turns off until when it is required to turn on again. The ΔTime (in minutes) is the duration of ΔTemp. For purposes of the present example, assume:

Cool set point=75° F.
Unoccupied entry time=7:00 pm
Setback entry temp differential=3° F.
Previously calculated temperature drift value=0.05

Specific temperatures are provided for example, but, in various embodiments of the invention, the temperatures chosen could be any temperature in a range of temperatures suitable for the operating conditions, for example, any temperature between 0° F. and 200° F., or any sub-range of temperatures therein, for example, 50° F. to 100° F., or 70° F. to 75° F.

The HVAC equipment is operating in the cool mode and the space temperature is 76° F. At what time can the HVAC equipment shut off and the space drift into setback, where at 7:00 pm the space temperature would be 78° F.?

Using the y-intercept formula, y=mx+b, and modifying to solve for m, $$m = \frac{78 - 76}{0.05} = 40 \text{ minutes} \qquad \text{Eq. 2}$$

Therefore, the HVAC equipment should enter setback at 6:20 pm (7:00 pm-40 minutes) and the space temperature will be 78° F. (cool set point+setback entry temp differential) at unoccupied entry time. Additionally, the system and method for controlling setback of a power-consuming device can also determine the previous setback recovery data (for example, change in temperature over change in time) for each thermostat and can store that previous setback recovery data.

Example 2

This example illustrates the control of setback recovery for HVAC equipment according to the second embodiment of the invention. In this example, the data received by the system for controlling setback recovery are as follows:

Target space temperature=74° F.
Target recovery time=7:00 am
Zone temperature=68° F.
Previous setback recovery performance=5° F. in 20 minutes Specific temperatures are provided for example, but, in various embodiments of the invention, the temperatures chosen could be any temperature in a range of temperatures suitable for the operating conditions, for example, any temperature between 0° F. and 200° F., or any sub-range of temperatures therein, for example, 50° F. to 100° F., or 70° F. to 75° F.

The time required for setback recovery is given by Equation 3, letting X equal minutes needed for setback recovery:

$$X = \frac{20 \text{ min}}{5° \text{ F.}} \times |74° \text{ F.} - 68° \text{ F.}| = 24 \text{ min} \qquad \text{Eq. 3}$$

Setback recovery for this HVAC unit would begin at 6:36 am.

The system for controlling setback recovery of power-consuming devices, can periodically calculate (or modify or adjust) the setback recovery time for at least one power consuming device in the power-consuming system, for example, for each thermostat communicatively coupled to a power-consuming device of the power-consuming system.

Example 3

Figure 2:
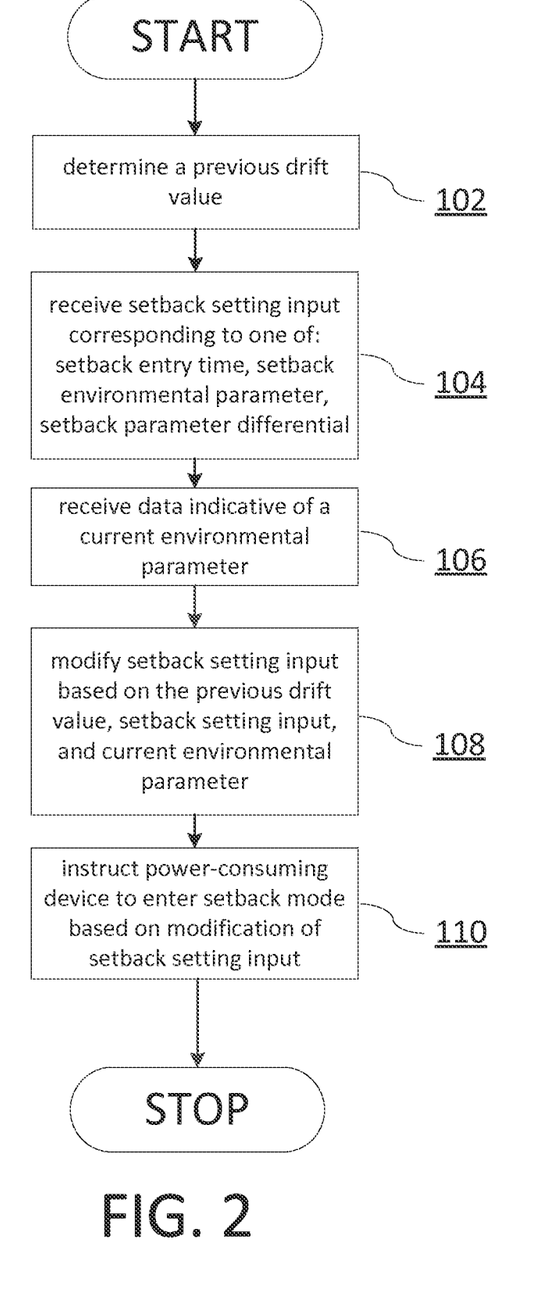
FIG. 2 is a flow diagram illustrating an embodiment of the method of the invention for controlling a setback mode of a power-consuming device.

FIG. 2 illustrates an example of the first aspect of the first embodiment of the invention, which is a method of controlling a setback mode of a power-consuming device. In step 102, a previous drift value is determined. The drift value relates to changes over the time when the power-consuming device is not operating. For example, during the normal operation of a thermostat in a business environment, during, for example, the time period in which the site is open for business, when employees or customers are typically located at the site, during the hours of operation of the site, or other time period in which the site is occupied), the thermostat calculates a temperature drift value. This value is the change in temperature over time when the HVAC equipment is not operating. For example, the system and method can monitor when the HVAC equipment reaches a specified temperature or predetermined threshold (for example, a preset or predefined temperature) and shuts off or enters a shut off mode, and when the HVAC equipment turns on and exits the shut-off mode when the HVAC equipment falls below or above the predetermined threshold (depending on whether the HVAC equipment is operating in a cooling mode or a heating mode). A new drift value can be calculated, according to Equation 4, after each HVAC operation event, where the previous drift value is discarded.

$$\text{Temperature Drift Value} = \frac{\Delta \text{Temp}}{\Delta \text{Time}} \qquad \text{Eq. 4}$$

Where ΔTemp is the temperature change from when the HVAC equipment turns off until when it is required to turn on again. The ΔTime (in minutes) is the duration of ΔTemp.

In step 104, a setback setting input is received corresponding to one or more of a setback entry time, a setback environmental parameter, and a setback parameter differential. For example, a power-consuming device may be a thermostat for a plurality of HVAC units. The thermostat may be programmed with a setback entry temperature differential parameter, for example, in a range of temperatures having an upper and lower limit. The range can exclude or include the upper and/or the lower limit. For example, the lower limit and/or upper limit can be selected from 1, 2, 3, 4, 5, 6, 7, 8, 9, 10, 11, 12, 13, 14, 15, 16, 17, 18, 19, and 20° F. For example, from 0-5° F. However, those of ordinary skill in the art will appreciate that the differential parameter can be a larger or smaller range of temperature, temperatures other than in Fahrenheit, a range other than by integers, or other differential parameters.

The setback environmental parameter may be, for example, the temperature of a thermostat of an HVAC unit. However, those of ordinary skill will appreciate that other environmental parameters of a power-consuming device can be monitored, for example, the amount of power consumed by the power-consuming device, the amount of fuel used by the power-consuming device, the amount of energy dissipated by the power-consuming the device, the speed at which an internal motor of a power-consuming unit is operating, or other parameter that is indicative of the amount of work and power the power-consuming device is consuming.

The setback entry time may be, for example, the time in which the power-consuming device is expected to be active, such as the time at which the business opens to customers, or the time at which employees arrive to work, etc.

In step 106, data is received which is indicative of a current environmental parameter, which may be of the same kind as the setback environmental parameters described above.

In step 108, the setback setting input is modified based on the previous drift value, the setback setting input, and the current environmental parameter. For example, an HVAC unit may be set to cool the environment to 75° F., with a setback differential parameter of 3° F., a setback entry time of 7:00 pm, a previous drift value of 0.05, and a current environmental parameter of 76° F. (the current temperature). In order for the environment to reach the setback temperature of 78° F. (75° F.+3° F.) at the setback entry time of 7:00 pm, the HVAC equipment should be shut off 40 minutes before 7:00 pm (i.e., 6:20 pm), based on Equation 5:

$$\frac{\text{target temp} - \text{current temp}}{\text{drift value}} = \text{drift time} \qquad \text{Eq. 5}$$

Thus, in this example, the setback setting input corresponding to setback entry time would be modified to 6:20 pm. In step 110, the power-consuming device may be instructed to enter setback mode based on the modification of the setback setting input, i.e., the HVAC equipment may be instructed to shut off at 6:20 pm, in order to allow the environment to drift to a temperature of 78° F. at 7:00 pm.

However, in various embodiments of the invention, the temperatures chosen could be any temperature in a range of temperatures suitable for the operating conditions, for example, any temperature between 0° F. and 200° F., or any sub-range of temperatures therein, for example, 50° F. to 100° F., or 70° F. to 75° F.

Example 4

Figure 3:
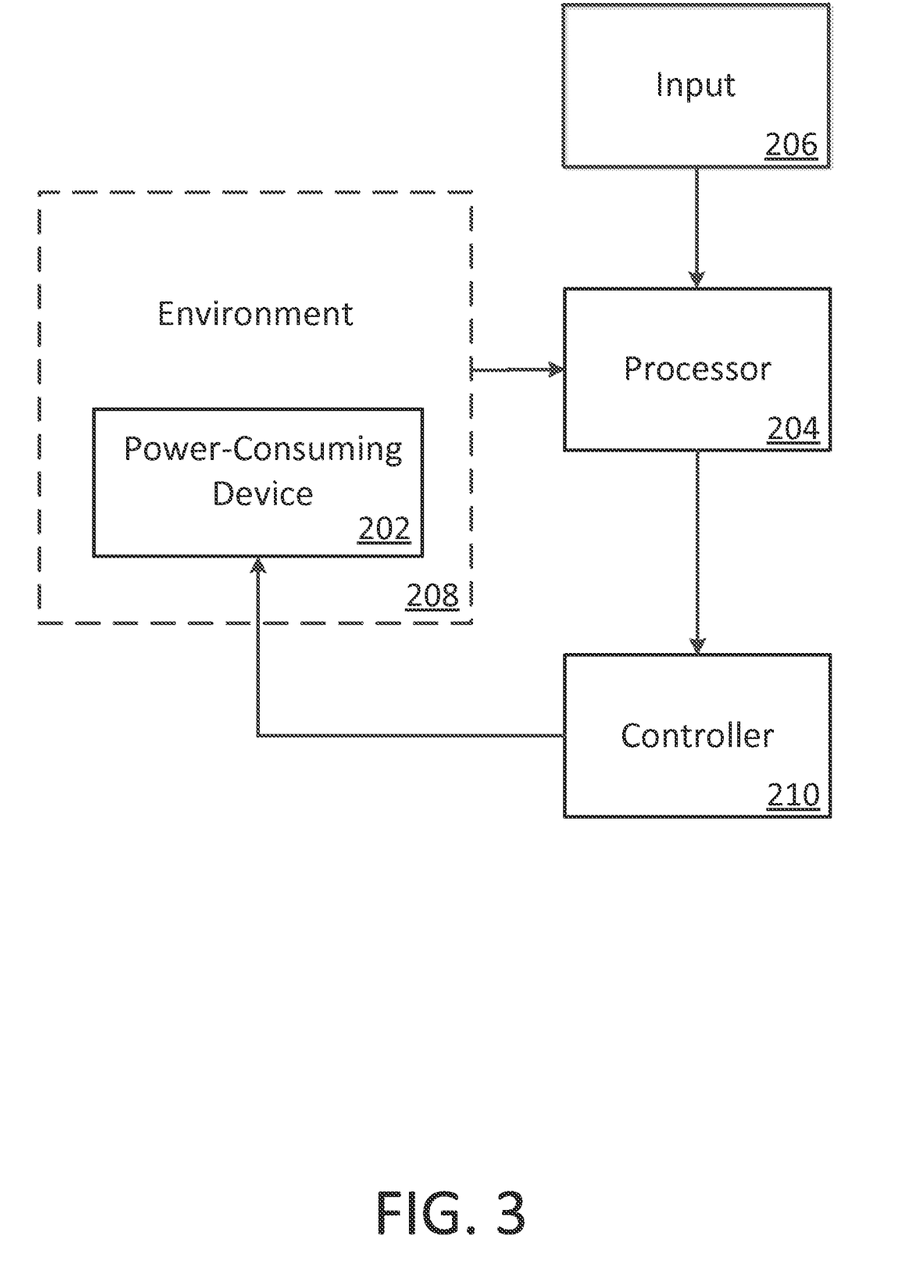
FIG. 3 is a block diagram illustrating an embodiment of a system suitable for controlling a setback mode of a power-consuming device.

FIG. 3 illustrates an example of the second aspect of the first embodiment of the invention, a system for controlling a setback mode of a power-consuming device 202. A processor 204 is configurable to determine a previous drift value, and to receive input 206 (i.e., a setback setting input), the input corresponding to at least one of a setback entry time, a setback environmental parameter, and a setback parameter differential. The processor 204 also receives data indicative of a current environmental parameter of environment 208, and modifies the setback setting input based at least on the previous drift value, the setback setting input, and the current environmental parameter.

The system also includes a controller 210 configurable to instruct the power-consuming device 202 to enter the setback mode based at least on the modification of the setback setting input by processor 204.

While a single system is illustrated, with a single power-consuming device 202, the various embodiments of the invention may also include a plurality of systems and a plurality of power-consuming devices.

The system and method for controlling the setback of a power-consuming device, in accordance with the present technology provides a learning process that allows a space (for example, a room, a building, or other similar environment) to drift into setback by a specified temperature differential at a specified time. This results in a completely controlled setback entry that is configurable.

The system and method for controlling the setback of a power consuming device (for example, a power-consuming device that is one of a plurality of power-consuming devices in a power-consuming system) allows for a substantially accurate change in temperature control to enter into setback.

The various embodiments of the present invention also include a system and method of controlling setback recovery of a power-consuming device, such as HVAC equipment, heating equipment, cooling equipment, temperature control equipment, lighting equipment, industrial machinery, manufacturing machinery, household appliances, or other power-consuming devices.

For example, the HVAC equipment in a commercial business may be in setback during night time hours, while the business is closed, where the HVAC equipment maintains a higher space temperature. However, when the business opens, the desired temperature may be lower, for the comfort of employees and customers. According to the various embodiments of the invention, a system and method for setback recovery is provided so that a power-consuming device may recover from a setback mode more efficiently. For example, if the HVAC equipment turns on at the time the business opens, it may take some time to bring the space temperature down to a preferred level, during which time the space may be uncomfortable for employees and customers. According to the various embodiments of the invention, the HVAC equipment can be activated at an appropriate time such that the temperature reaches the preferred level at the preferred time.

In the various embodiments of the invention, the systems and methods for controlling setback recovery of a plurality of power-consuming devices can determine an improved time for each device to come out of setback and reach an occupied set point at a specified point in time, while eliminating the influence of the other power-consuming devices on recovery. For example, the method of controlling setback recovery of a power-consuming device can determine an advantageous time for HVAC equipment to come out of night setback and reach an occupied set point at a specified point in time, while eliminating the influence of nearby HVAC units on a recovery thermostat. This method of controlling setback recovery addresses the issue of multiple HVAC units providing heating/cooling for spaces that are not isolated zones. When a HVAC unit is heating or cooling a space and a thermostat for a different HVAC unit is being influenced, this influence can impact that thermostat's setback recovery and in some cases, not actually come out of setback early and have the other HVAC unit do all the recovery work. The present technology can solve the power-efficiency issues that can result from such a situation. The various embodiments of the invention can control a particular unit's thermostat's setback recovery without the influence of a different unit's thermostat.

Example 5

Figure 4:
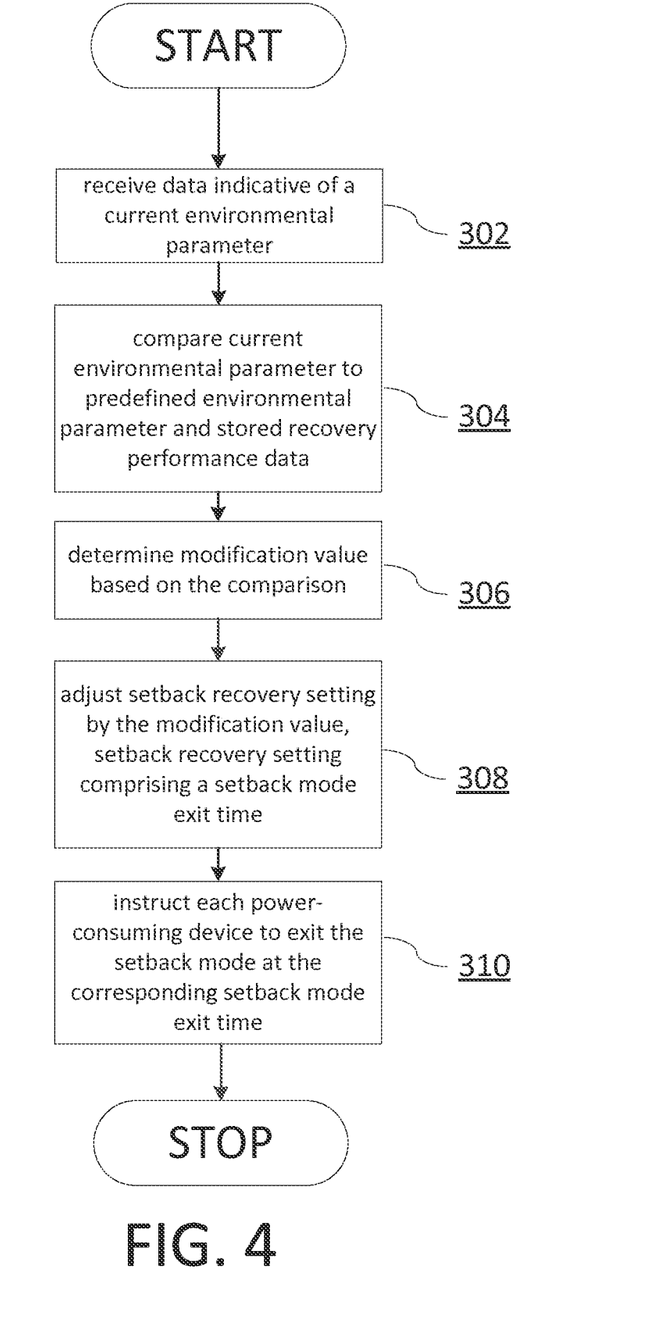
FIG. 4 is a flow diagram illustrating an embodiment of the method of the invention for controlling setback recovery of power-consuming devices.

FIG. 4 illustrates an example of the first aspect of the second embodiment of the invention, a method of controlling setback recovery of power-consuming devices. In step 302, data is received which is indicative of a current environmental parameter for each of a plurality of power-consuming devices, the devices being in a setback mode. For example, a current environmental parameter may be the current temperature read by a thermostat connected to one of a plurality of HVAC systems.

In step 304, each current environmental parameter is compared to a predefined environmental parameter of each power-consuming device, and a stored recovery performance data of each power-consuming device. For example, in an HVAC system, a predefined environmental parameter may be a target space temperature, and a stored recovery performance data may be the previous setback recovery performance, for example, a change of 5° F. achieved in 20 minutes.

In step 306, a modification value is determined for each power-consuming device based at least on the corresponding comparison of step 304. For example, in an HVAC system with a target space temperature of 74° F., and a current environmental temperature of 68° F., and a previous setback recovery performance of 5° F. in 20 minutes, the modification value may be determined using the Equation 6:

$$\frac{20 \text{ min}}{5° \text{ F.}} \times |74° \text{ F.} - 68° \text{ F.}| = 24 \text{ minutes} \qquad \text{Eq. 6}$$

In step 308, a setback recovery setting of each power-consuming device is adjusted by the corresponding modification value, the setback recovery setting comprising a setback mode exit time of the power-consuming device. For example, in an HVAC system as described above, with a setback recovery setting of 7:00 am, the setback recovery setting would be adjusted by the modification value of 24 minutes, resulting in a setback recovery setting of 6:36 am. Thus, the HVAC unit would begin recovery at 6:36 am.

In step 310, the each power-consuming device may be instructed to exit the setback mode at the corresponding setback mode exit time. Thus, each power-consuming device would begin recovery at 6:36 am, and each zone would reach the desired space temperature at the desired time of 7:00 am, without the power-consuming devices interfering with the recovery of another.

Example 6

Figure 5:
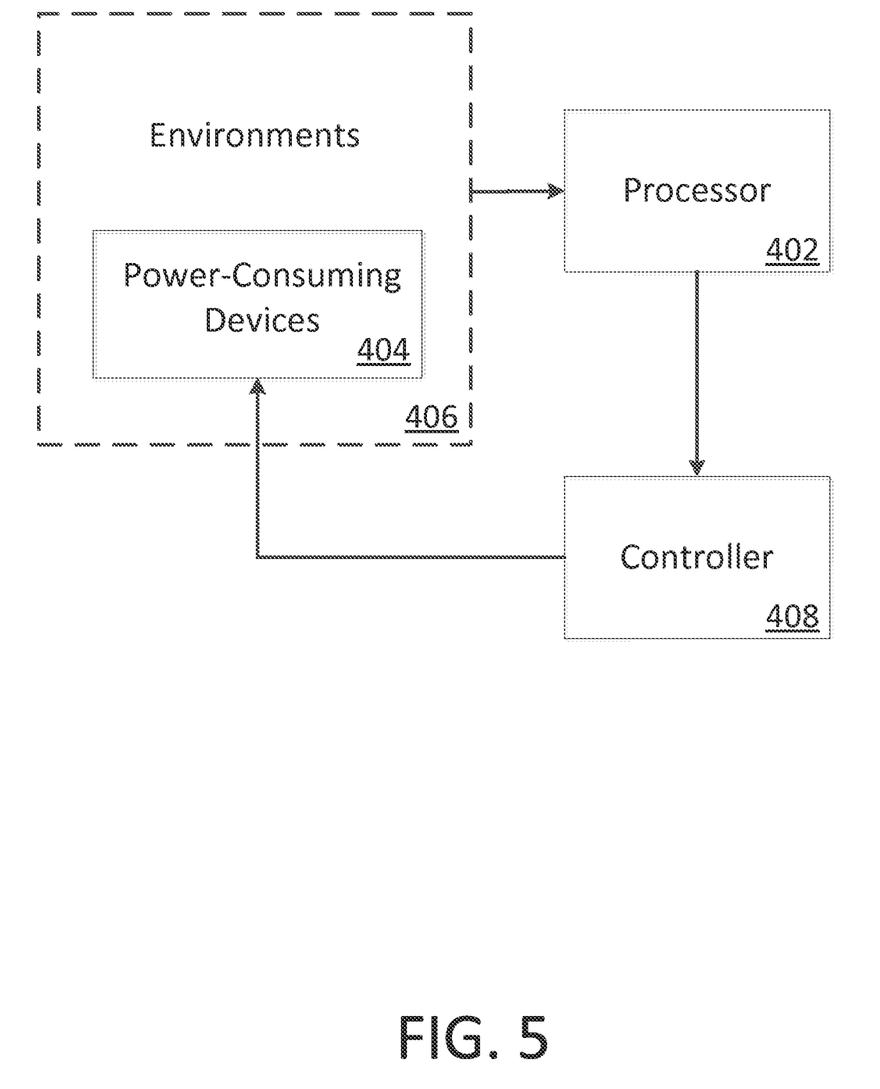
FIG. 5 is a block diagram illustrating an embodiment of a system suitable for controlling setback recovery of power-consuming devices.

FIG. 5 illustrates an example of the second aspect of the second embodiment of the invention, a system for controlling setback recovery of power-consuming devices. The system includes a processor 402 configurable to receive data indicative of a current environmental parameter of each of a plurality of power-consuming devices 404, each in a respective environment/zone 406. The processor compares each current environmental parameter to a predefined environmental parameter of each power-consuming device 404 and a stored recovery performance data of each power-consuming device 404, and determines a modification value for each power-consuming device 404 based at least on that comparison. The processor can then adjust a setback recovery setting of each power-consuming device 404, the setback recovery setting comprising a setback mode exit time of the power-consuming device. The system also includes a controller 208, configurable to instruct each power-consuming device 204 to exit the setback mode at the corresponding setback mode exit time.

It may also be appreciated that the disclosed setback and setback recovery methods and systems may operate together in the same system. It may further be appreciated that the setback and setback recovery methods and systems may operate in conjunction with one or more other controller algorithms, such as a load curtailment algorithm that adjusts consumption based on historical consumption, a humidity control algorithm that uses HVAC systems to remove humidity from indoor air, a demand control ventilation control algorithm that that draws external air into the system to affect air quality, and a dynamic setpoint algorithm that adjusts the current setpoint based on current outdoor environmental conditions such as temperature or humidity. Because the algorithms can operate on the same controller, the system can prevent conflicts between working algorithms by choosing the most energy efficient output of the algorithms. Each algorithm has its own comfort limits, so the most energy efficient output already considers comfort of the building's occupants.

While the invention has been described in connection with a number of embodiments and implementations, it should be understood that the detailed description and the specific examples, while indicating specific embodiments of the disclosure, are given by way of illustration only, since various changes, modifications, and equivalents within the spirit and scope of the disclosure will become apparent to those skilled in the art from this detailed description. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

What is claimed is:

1. A computer-implemented method for controlling setback recovery of a power-consuming device, the method comprising:
receiving data indicative of a current environmental parameter of the power-consuming device being in a setback mode;
comparing the current environmental parameter to a predefined environmental parameter of the power-consuming device and a stored recovery performance data of the power-consuming device;

determining a modification value for the power-consuming device based at least on the comparison of the comparing step;

adjusting a setback recovery setting of the power-consuming device by the modification value, the setback recovery setting comprising a time at which the power-consuming device will exit the setback mode;

monitoring a shut-off time corresponding to the power-consuming device entering a shut-off mode;

monitoring a turn-on time corresponding to the power-consuming device exiting the shut-off mode;

computing a difference between the shut-off time and the turn-on time;

computing a current drift value based at least on the predefined environmental parameter and the current environmental parameter when the current environmental parameter is not within a predefined threshold of the predefined environmental parameter, and the computed difference between the shut-off time and the turn-on time;

replacing a previous drift value with the current drift value; and instructing, based on replacing the previous drift value with the current drift value, the power-consuming device to:

exit the setback mode according to the adjusted setback recovery setting; and enter, based on exiting the setback mode, a previously determined normal mode of operation of the power-consuming device.

2. The computer-implemented method of claim 1, the method further comprising:

sending instructions to the power-consuming device to exit the setback mode based at least on the adjusted setback recovery setting.

3. The computer-implemented method of claim 2, the method further comprising:

monitoring the current environmental parameter until the power-consuming device enters the setback mode;

calculating a recovery performance data for the power-consuming device based at least on the current environmental parameter, wherein the recovery performance data comprises a rate of change of the current environmental parameter while the current environmental parameter is being monitored; and replacing the stored recovery performance data for the power-consuming device with the calculated recovery performance data.

4. The computer-implemented method of claim 2, wherein a plurality of power-consuming devices including the power-consuming device are instructed to exit the setback mode at a same time.

5. The computer-implemented method of claim 2, wherein a plurality of power-consuming devices including the power-consuming device are instructed to exit the setback mode at various times.

6. The computer-implemented method of claim 1, wherein the current environmental parameter is a current temperature read by a thermostat connected to one of a plurality of HVAC systems, and the predefined environmental parameter is a target temperature.

7. The computer-implemented method of claim 1, wherein the modification value for the power-consuming device is a time required to recover from the current environmental parameter to the predefined environmental parameter based on a rate of change the stored recovery performance data.

8. A system for controlling setback recovery of a power-consuming device, the system comprising:

a data storage device storing instructions for controlling setback recovery of a power-consuming device in an electronic storage medium; and a processor configured to execute the instructions to perform a method including:

receiving data indicative of a current environmental parameter of a power-consuming device being in a setback mode;

comparing the current environmental parameter to a predefined environmental parameter of the power-consuming device and a stored recovery performance data of the power-consuming device;

determining a modification value for the power-consuming device based at least on the comparison of the comparing step;

adjusting a setback recovery setting of the power-consuming device by the modification value, the setback recovery setting comprising a time at which the power-consuming device will exit the setback mode;

monitoring a shut-off time corresponding to the power-consuming device entering a shut-off mode;

monitoring a turn-on time corresponding to the power-consuming device exiting the shut-off mode;

computing a difference between the shut-off time and the turn-on time;

computing a current drift value based at least on the predefined environmental parameter and the current environmental parameter when the current environmental parameter is not within a predefined threshold of the predefined environmental parameter, and the computed difference between the shut-off time and the turn-on time;

replacing a previous drift value with the current drift value;

instructing, based on replacing the previous drift value with the current drift value, the power-consuming device to:

exit the setback mode according to the setback recovery setting; and enter, based on exiting the setback mode, a previously determined normal mode of operation of the power-consuming device.

9. The system of claim 8, wherein the system is further configured for:

sending instructions to the power-consuming device to exit the setback mode based at least on the adjusted setback recovery setting.

10. The system of claim 9, wherein the system is further configured for:

monitoring the current environmental parameter until the power-consuming device enters the setback mode;

calculating a recovery performance data for the power-consuming device based at least on the current environmental parameter, wherein the recovery performance data comprises a rate of change of the current environmental parameter while the current environmental parameter is being monitored; and replacing the stored recovery performance data for the power-consuming device with the calculated recovery performance data.

11. The system of claim 9, wherein a plurality of power-consuming devices including the power-consuming device are instructed to exit the setback mode at a same time.

12. The system of claim 9, wherein a plurality of power-consuming devices including the power-consuming device are instructed to exit the setback mode at various times.

13. The system of claim 8, wherein the modification value for the power-consuming device is a time required to recover from the current environmental parameter to the predefined environmental parameter based on a rate of change the stored recovery performance data.

* * * * *

UNITED STATES PATENT AND TRADEMARK OFFICE
CERTIFICATE OF CORRECTION

| | | |
|---|---|---|
| PATENT NO. | : 12,346,142 B2 | Page 1 of 1 |
| APPLICATION NO. | : 18/183757 | |
| DATED | : July 1, 2025 | |
| INVENTOR(S) | : Daniel K. Dyess and E. Channing Preston, Jr. | |

It is certified that error appears in the above-identified patent and that said Letters Patent is hereby corrected as shown below:

In the Specification
In Column 1, Line 13, please delete "2012,now" and insert --2012, now--.

In the Claims
In Column 17, Line 28, in Claim 1, delete "setting:" and insert --setting;--.

Signed and Sealed this
Second Day of September, 2025

Coke Morgan Stewart
*Acting Director of the United States Patent and Trademark Office*